United States Patent
Grase et al.

(10) Patent No.: US 10,099,766 B2
(45) Date of Patent: Oct. 16, 2018

(54) PRESSURIZED AIRPLANE FUSELAGE, COMPRISING A PRESSURE BULKHEAD

(71) Applicant: Airbus Operations GmbH, Hamburg (DE)

(72) Inventors: Karim Grase, Hamburg (DE); Ichwan Zuardy, Hamburg (DE); Henning Scheel, Hamburg (DE); Dieter Hachenberg, Hamburg (DE); B. Claudio Vultaggio, Hamburg (DE)

(73) Assignee: Airbus Operations GmbH (DE)

( * ) Notice: Subject to any disclaimer, the term of this patent is extended or adjusted under 35 U.S.C. 154(b) by 269 days.

(21) Appl. No.: 13/970,656

(22) Filed: Aug. 20, 2013

(65) Prior Publication Data

US 2014/0054419 A1 Feb. 27, 2014

Related U.S. Application Data

(60) Provisional application No. 61/691,906, filed on Aug. 22, 2012.

(30) Foreign Application Priority Data

Aug. 22, 2012 (DE) .................. 10 2012 016 553

(51) Int. Cl.
  *B64C 1/10* (2006.01)
(52) U.S. Cl.
  CPC ..................... *B64C 1/10* (2013.01)
(58) Field of Classification Search
  CPC ........... B64C 7/00; B64C 1/1492; B64C 1/12; B64C 1/06; B64C 1/068; B64C 1/10; B29C 66/532; B29C 65/5057; B29L 2031/7096; B29L 2031/003; B29L 2031/3076; F17C 2209/232; F16B 1/00; B21D 53/92; B64G 1/64; B64D 37/06
  USPC .............. 244/121, 125, 126, 129.1; 29/897.2
  See application file for complete search history.

(56) References Cited

U.S. PATENT DOCUMENTS

| 5,934,618 A * | 8/1999 | Kari ...................... B64D 37/06 220/562 |
| 6,276,866 B1 * | 8/2001 | Rutan ................... B29C 65/562 244/119 |
| 7,625,623 B2 * | 12/2009 | Grose .................. B29C 65/527 244/131 |

(Continued)

FOREIGN PATENT DOCUMENTS

| DE | 10 2007 052 140 A1 | 5/2009 |
| DE | 10 2008 040 213 A1 | 1/2010 |

(Continued)

*Primary Examiner* — Medhat Badawi
*Assistant Examiner* — Vicente Rodriguez
(74) *Attorney, Agent, or Firm* — Lerner, David, Littenberg, Krumholz & Mentlik, LLP

(57) ABSTRACT

A pressurized aircraft fuselage includes a pressure bulkhead installed on a fuselage structure, which forms a barrier between an internal pressurized cabin area and an outside area, wherein the edge of the pressure bulkhead is circumferentially attached to the fuselage structure by fastening means, wherein the fastening means include a pair of ring-shaped attachment frames made of an open or hollow profile, which are disposed at each side of the pressure bulkhead respectively, in order to form a clamping connection for the pressure bulkhead towards the fuselage structure.

9 Claims, 2 Drawing Sheets

(56) References Cited

U.S. PATENT DOCUMENTS

| | | | |
|---|---|---|---|
| 8,033,503 B2 * | 10/2011 | Basso | 244/119 |
| 8,418,963 B2 * | 4/2013 | Arevalo Rodriguez et al. | 244/133 |
| 8,444,089 B2 * | 5/2013 | Mischereit et al. | 244/119 |
| 8,985,515 B2 * | 3/2015 | McCullough | B29D 99/001 244/131 |
| 2008/0295334 A1 * | 12/2008 | Kulesha | B64C 1/06 29/897.2 |
| 2010/0230539 A1 | 9/2010 | Mischereit et al. | |
| 2010/0243806 A1 * | 9/2010 | Vera Villares et al. | 244/119 |
| 2010/0258673 A1 | 10/2010 | Garcia Laja et al. | |
| 2011/0024563 A1 | 2/2011 | Bauer et al. | |
| 2011/0179626 A1 | 7/2011 | Weber et al. | |
| 2011/0233334 A1 | 9/2011 | Stephan | |
| 2012/0228427 A1 | 9/2012 | Sayilgan et al. | |

FOREIGN PATENT DOCUMENTS

| | | |
|---|---|---|
| DE | 10 2009 035 265 A1 | 2/2011 |
| DE | 10 2009 049 007 A1 | 4/2011 |
| DE | 10 2010 018 931 A1 | 11/2011 |
| DE | 10 2007 044 388 B4 | 8/2012 |

* cited by examiner

PRESSURIZED AIRPLANE FUSELAGE, COMPRISING A PRESSURE BULKHEAD

CROSS-REFERENCE TO RELATED APPLICATIONS

This application claims the benefit of the filing date of German Patent Application No. 10 2012 016 553.6, filed Aug. 22, 2012 and of U.S. Provisional Patent Application No. 61/691,906, filed Aug. 22, 2012, the disclosures of which applications are hereby incorporated herein by reference.

TECHNICAL FIELD OF THE INVENTION

The invention relates to a pressurized airplane fuselage, comprising a pressure bulkhead installed on a fuselage structure, which forms a barrier between an internal pressurized cabin area and an outside area, wherein the edge of the pressure bulkhead is circumferentially attached to the fuselage structure by special fastening means.

BACKGROUND OF THE INVENTION

The pressure bulkhead for an aircraft is the structural component which supports the pressure of the fuselage of the aircraft at its ends. The stress that the fuselage of the aircraft is subjected to particularly when said fuselage is depressurized, in this case adding the negative pressure of the fuselage with the stress due, for example, to the load from the vertical stabilizer or in general flight loads are adding and interacting loads to the rear pressure bulkheads and its component parts. In addition, it is even more necessary with modern aircraft designs to manufacture pressure bulkheads minimizing their weight while at the same time maintaining their stiffness.

Pressure bulkheads made of metal, particularly aluminum or titanium, are known in the art, although these designs require metal stiffeners providing these bulkheads with sufficient stiffness to support fuselage stress.

In addition, pressure bulkheads made of a composite material or reinforced plastic materials, mainly carbon fiber reinforced with plastic, are known which also require stiffeners to support stress coming from a fuselage.

The US 2010/0258673 A1 discloses a cured rear pressure bulkhead comprising three layers, namely an outer and inner layer symmetrical in relation to one another, are formed by a fiber laminate, the intermediate layer or core being formed by light weight material. With such a sandwich-type shape, the resulting bulkhead is able to withstand the bending loads coming from the stress and pressurization of the fuselage without having to increase its stiffness by means of the use of some type of stiffener.

To allow the assembly of said bulkhead to the aircraft fuselage structure, the bulkhead further comprises a ring made by means of resin transfer molding, or RTM, or it is made of titanium, divided into several pieces to facilitate attaching the bulkhead to the fuselage structure. The ends of the curved pressure bulkhead are formed only by one fiber laminate, such that these ends are attached to the ring by means of rivets, in turn attaching sections of the ring to the aircraft fuselage structure by means of the corresponding rivets.

In contrast to the forgoing described prior art the DE 10 2010 018 931 A1 discloses a flat shaped pressure bulkhead for a fuselage of an aircraft according to the subject matter of the present invention.

The flat pressure bulkhead is configured for bounding a fuselage interior relative to an external environment. The flat pressure bulkhead includes a flat skin configured to span across-section of the fuselage and having a cavity disposed at the core region of the skin. The core region is radially bounded by a ring element. A plurality of radial stiffeners extend on the skin and provide a stabilization of the skin. Each radial stiffener is fixed at an end to the ring element. A reinforcement element extend over the ring element.

The connection of the flat pressure bulkhead to the fuselage is realized via a peripheral pressure frame arranged in the fuselage. The pressure frame at the same time takes on the function of a butt joint plate for purpose of connecting to fuselage sections, which are spaced apart from one another by an axial gap that is to be closed. The joining of the pressure frame to the fuselage sections is realized via mechanical connecting elements such as rivets, which are guided through an outer flange and the fuselage sections.

BRIEF SUMMARY OF THE INVENTION

An aspect of the present invention provides a simple and stable mechanical connection between a preferably flat pressure bulkhead and a fuselage structure of an airplane for high torsional and radial stiffness.

The present invention proposes special fastening means for attaching the preferably flat bulkhead to the fuselage structure which comprise a pair of annular attachment frames made of an open or hollow profile, which are disposed at each side of the pressure bulkhead respectively, in order to form a clamping connection for the pressure bulkhead towards s the fuselage structure.

The solution according to an aspect of the present invention provides a kind of double box frame for clamping the bulkhead in between which results in a high torsional and radial stiffness. The edge of the bulkhead is riveted towards the fuselage structure. The connection is realized according to conventional design principles of bolted joined connections between the parts to be assembled. The invention is especially suitable for flat pressure bulkheads, since inducted loads like forces and moments from the flat or lens shaped bulkhead towards the surrounding fuselage structure are moderate. The said double box frame according to the present invention principally consist of two open or hollow profiles, made of metal or reinforced plastic material, especially carbon fiber plastic material. Alternatively, the annular attachment frame can also consist of a metal, preferably titanium or aluminum material. The hollow profile is a closed profile section, which activates sufficient torsional stiffness.

According to a preferred embodiment of the invention each annular attachment frame is attached to the edge of the pressure bulkhead and to the fuselage structure by means of a rivet connection, comprising several adjacent lines of rivets.

If the annular attachment frame is made of a hollow profile, it consists of at least to single annular open profile parts which are assembled together after riveting on to the pressure bulkhead and the fuselage structure in order to form the hollow profile. Each of the profile parts can be made of either one single extruded, deep drawn or milled single part, or even of two or more single parts assembled together in different steps.

In case of hollow profiles the ring-shape attachment frame could also be made of a C- or U-shaped open profile material. Preferably, both open profiles are back-to-back arranged one to in another. The bulkhead is placed right in between these two profiles and riveted towards the inner structure.

In order to increase the stiffness of the construction it is recommended to insert reinforcement plates in the open profiled annular attachment frame in a mutually spaced manner. Alternatively, it is also possible to arrange several intercostal parts length wise between the annular attachment frame and an adjacent frame of the fuselage structure. These intercostal parts or the said reinforcement plates are provided for an efficient torsional stiffness and load transfer into the surrounding fuselage structure.

According to another aspect of the present invention the annular attachment frames are mirror-inverted arranged one to another to both sides of the pressure bulkhead in order to lower the manufacturing effort. If the annular attachment frames are made of a hollow profile it is recommended to provide cut-outs in order to suit maintain, production and weight saving requirements.

Other features and details of present invention will be understood from the following description of the embodiments of its object in relation to the attached figures.

BRIEF DESCRIPTION OF THE DRAWINGS

In the figures the same design elements are provided with the same reference numbers, wherein where there is plurality of the same design elements in one figure just one of these elements is provided with a reference number in the interests of clarity. All figures are schematic.

DETAILED DESCRIPTION

Figure 1:
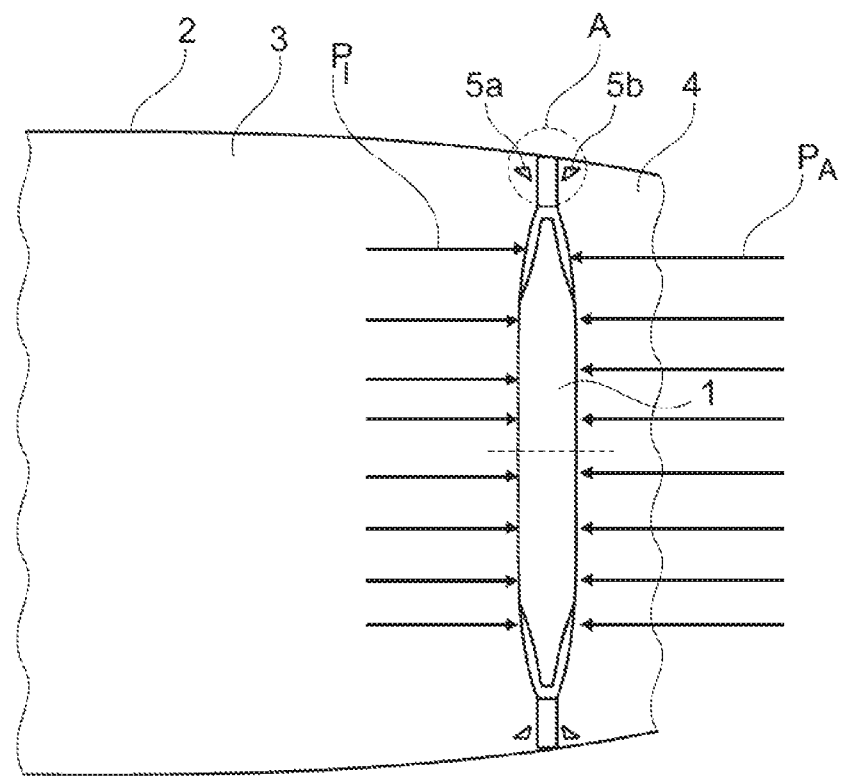
FIG. 1 shows a schematic side view of the position of a rear pressure bulkhead in a typical pressurized aircraft fuselage schematically illustrating the fastening means according to an embodiment of the invention.

In view of FIG. 1 a pressure bulkhead 1 is provided for installing on a fuselage structure 2 of an aircraft. The pressure bulkhead 1 forms a barrier between an internal pressurized cabin area 3 and an outside area 4 which represent the environment.

The edge of the flat-shaped pressure bulkhead 1 is circumferentially attached to the fuselage structure 2 by special fastening means (Detail A) according to an embodiment of the invention.

Figure 2:
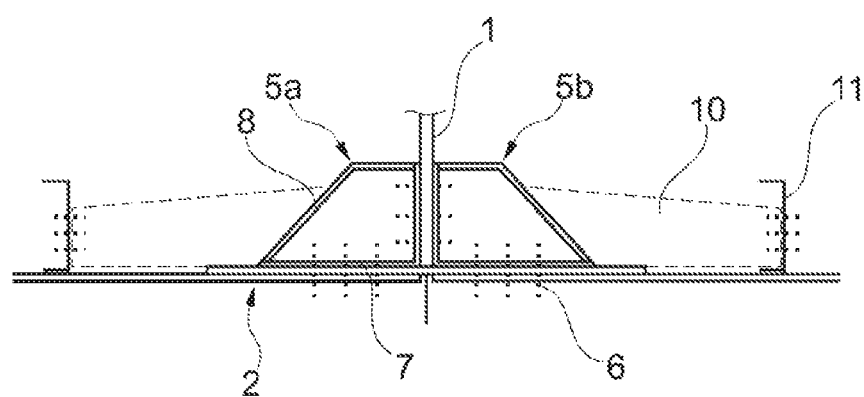
FIG. 2 shows a side view of the detail A of FIG. 1 in the area of the fastening means for attaching the pressure bulkhead to the fuselage in structure in a first embodiment.

According to FIG. 2 which shows an enlarged view of Detail A, the special fastening means comprise a pair of annular attachment frames 5a, 5b made of an open or hollow profile, which are disposed at each side of the pressure bulkhead 1 respectively, in order to form a clamping connection for the pressure bulkhead 1 towards the fuselage structure 2.

In the present embodiment, the annular attachment frames 5a, 5b are made of a metal material, especially titanium, having a square cross section. Each annular attachment frame 5a and 5b is attached to the edge of the pressure bulkhead 1 as well as to the fuselage structure 2 by means of a rivet connection, comprising several adjacent lines of rivets 6.

The hollow profiled annular attachment frames 5a and 5b consist of two single annular open profile parts 7 and 8. The open profile parts 7 and 8 of the annular attachment frames 5a and 5b respectively are assembled together after riveting onto the pressure bulkhead 1 and the fuselage structure 2.

Additionally, several intercostal parts 10 are lengthwise arranged between the annular attachment frame 5a and 5b and an adjacent frame 11 of the fuselage structure 2.

Figure 3:
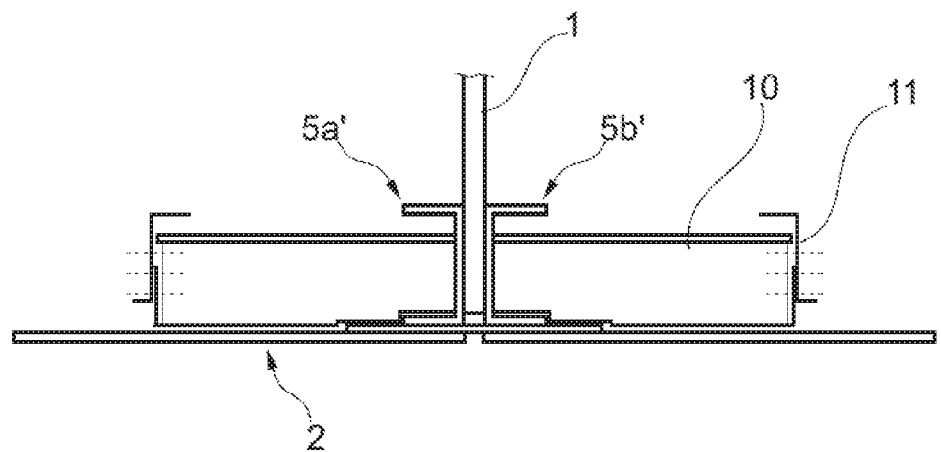
FIG. 3 shows a side view of the detail A of FIG. 1 in the area of the fastening means for attaching the pressure bulkhead to the fuselage in structure in a second embodiment.

In view of the second embodiment as shown in FIG. 3 each annular attachment frame 5a' and 5b' is made of a C-shaped open profile material, especially a reinforced plastic material.

Both annular attachment frames 5a' and 5b' are mirror-inverted arranged one to another to both sides of the pressure bulkhead 1. Additionally, several intercostal parts 10 are provided between the annular attachment frames 5a' and 5b' and adjacent frames 11 of the fuselage structure 2.

Figure 4:
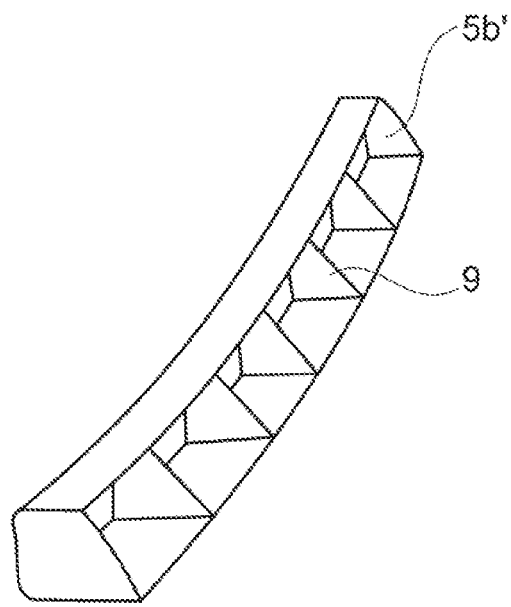
FIG. 4 shows a perspective view of another embodiment of the annular attachment frame.

FIG. 4 shows—as an example—a perspective view of a section of a single annular attachment frame 5b' which is made of a C-shaped open profile material. The attachment frame 5b' is provided with several reinforcement plates 9 which are arranged in an mutually spaced manner one to another in order to increase the stiffness of the attachment frame 5b' instead of an intercostal part.

Any modifications comprised within the scope defined by the following claims can be introduced in the preferred embodiment just described.

The invention claimed is:

1. A pressurized aircraft fuselage, comprising:
a pressure bulkhead installed on a fuselage structure, and forming a barrier between an internal pressurized cabin area and an outside area,
wherein an edge of the pressure bulkhead is circumferentially attached to the fuselage structure by fastening means,
wherein the fastening means comprise first and second annular attachment frames, the first attachment frame disposed at one side of the pressure bulkhead, the second attachment frame disposed at other side of the pressure bulkhead, and each of the first and second attachment frames having a hollow frame profile that clamps the pressure bulkhead from corresponding side of the pressure bulkhead to form a clamping connection of the pressure bulkhead to the fuselage structure;
wherein a first side of each of the hollow frame profiles rests against the pressure bulkhead and a second side of each of the hollow frame profiles rests against the fuselage structure;
wherein each of the hollow frame profiles comprises a member connecting the first side and the second side such that the hollow frame profiles are tapered away from the bulkhead; and
wherein the first and second attachment frames are oriented back-to-back one to another such that the pressure bulkhead is clamped by the first and second attachment frames by the first sides of the hollow frame profiles.

2. The pressurized aircraft fuselage according to claim 1, wherein each of the first and second annular attachment frames having a hollow frame profile is made of a square hollow profile material.

3. The pressurized aircraft fuselage according to claim 1, wherein the first and second annular attachment frames are made of a metal or a reinforced plastic material.

4. The pressurized aircraft fuselage according to claim 3, wherein the first and second annular attachment frames are made of a titanium metal material or a carbon fiber plastic material.

5. The pressurized aircraft fuselage according to claim 1, wherein each of the first and second annular attachment frames is attached to the edge of the pressure bulkhead and to the fuselage structure by a rivet connection, comprising a plurality of adjacent lines of rivets.

6. The pressurized aircraft fuselage according to claim 1, wherein each of the hollow profiled first and second annular attachment frame comprises at least first and second single annular open profile parts assembled together after riveting onto the pressure bulkhead and the fuselage structure to form the hollow profile.

7. The pressurized aircraft fuselage according to claim 1, further comprising, in each of the open profiled first and second annular attachment frames, reinforcement plates attached to the annular attachment frame in a spaced apart manner.

8. The pressurized aircraft fuselage according to claim 1, further comprising a plurality of intercostal parts arranged lengthwise between each of the first and second annular attachment frames and an adjacent frame of the fuselage structure.

9. The pressurized aircraft fuselage according to claim 1, wherein the first and second annular attachment frames are mirror-inverted arranged one to another to both sides of the pressure bulkhead.

* * * * *